United States Patent Office 3,629,243
Patented Dec. 21, 1971

3,629,243
14α,17α-METHYLENEDIOXYPREGNANE DERIVATIVES
Arthur F. Marx and Hermanus J. Kooreman, Delft, Netherlands, assignors to Koninklijke Nederlandsche Gist-En Spiritusfabriek N.V., Delft, Netherlands
No Drawing. Filed June 5, 1969, Ser. No. 831,824
Claims priority, application Netherlands, June 7, 1968, 6808047
Int. Cl. C07c 173/00
U.S. Cl. 260—239.55 D
41 Claims

ABSTRACT OF THE DISCLOSURE

14α,17α - methylenedioxypregnane derivatives which have anti-inflammatory activity are provided. In the new pregnane compounds, positions 14 and 17 of the steroid nucleus are bridged by a carbon atom and two oxygen atoms, forming a 1,3-dioxane ring with carbon atoms 14, 13 and 17 of the steroid nucleus.

BACKGROUND OF THE INVENTION

The invention relates to new therapeutically useful steroids of the pregnane series, to processes for their preparation and to pharmacological compositions containing them.

SUMMARY OF THE INVENTION

According to the present invention there are provided new 14α,17α-methylenedioxypregnane derivatives of the formula

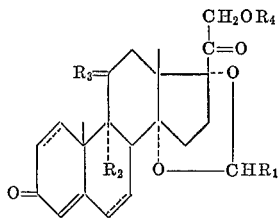

1 in which the dotted lines in the positions 1–2 and 6–7 indicate, as is conventional, the optional presence of another bond, and wherein $R_1$ represents (a) a straight or branched chain aliphatic hydrocarbon group, which group has less than 9 carbon atoms and may be substituted by a (lower)alkoxy carbonyl group, (b) an aryl group, which aryl group has less than 11 carbon atoms and may be substituted by halogen atoms, lower alkyl, and lower alkoxy groups, (c) an aryl (lower alkyl) group, (d) a cycloalkyl group having 3 to 6 carbon atoms, (e) the furyl group, or (f) the thienyl group;
$R_2$ represents an α-hydrogen atom or an α-halogen atom;
$R_3$ represents an α-hydrogen atom and a β-hydroxyl group or a β-halogen atom or $R_3$ represents an oxo group, and $R_4$ represents a hydrogen atom or an acyl group.

As will be apparent from Formula 1, the carbon atoms 14 and 17 of the steroid skeleton are bridged by one carbon atom and two oxygen atoms that are arranged in such a way that they form a 1,3-dioxane ring system with the carbon atoms 14, 13 and 17 of the steroid skeleton.

The pregnane derivatives of Formula 1 are therapeutically useful compounds possessing anti-inflammatory activity. These properties make the compounds of the invention useful in the treatment of allergic and rheumatic disorders and of various skin diseases. These compounds can be applied for human as well as veterinary uses; they can be administered orally as well as parenterally; they can also be applied locally, f.i. on the skin.

DESCRIPTION OF THE PREFERRED EMBODIMENTS

Preferred compounds of Formula 1 are those wherein $R_1$ represents a straight or branched chain alkyl group, which group has less than 5 carbon atoms, or a phenyl group, which group may be substituted (preferably in the para-position) by a halogen, preferably a chlorine atom, a lower alkyl or lower alkoxy, preferably methoxy group, or a phenyl(lower)alkyl group, a cyclopropyl, furyl or thienyl group; $R_2$ represents an α-hydrogen atom or an α-halogen, preferably chlorine or bromine atom, $R_3$ represents an α-hydrogen atom and a β-hydroxyl group or when $R_2$ represents a chlorine atom $R_3$ represents an α-hydrogen atom and a β-halogen, preferably chlorine atom; and $R_4$ represents a hydrogen atom or an organic acyl group.

The 14α,17α-methylenedioxypregnane derivatives of Formula 1 may be prepared by methods known for the preparation of analogous compounds.

According to a process of the invention the pregnane derivatives of Formula 1 are prepared by reacting a 14α,17α-dihydroxypregnane derivatives of the formula

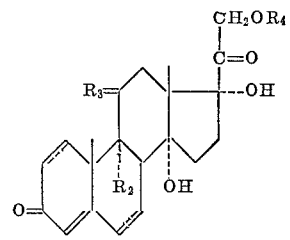

wherein the various symbols are as hereinbefore defined, with an aldehyde of the formula $R_1CHO$ or its acetal of the formula $R_1CH(OR_5)_2$, wherein $R_1$ is as hereinbefore defined and $R_5$ represents a lower alkyl group. When $R_4$ in Formula 2 represents a hydrogen atom, the 21-hydroxyl group is preferably protected, e.g. by esterification, before these reactions are carried out.

The reaction of a 14α,17α-dihydroxypregnane derivative of Formula 2 with an aldehyde of the formula $R_1CHO$ is preferably conducted at room temperature using a strong acid as catalyst and, if desired, in an inert organic medium. (Chem. & Ind. (London) 1961, 465); in case an acetal of the formula $R_1CH(OR_5)_2$ is employed, it has been found suitable to carry the reaction out at a temperature between 20° C. and 100° C. in the presence of a strong acid as catalyst; the lower alcohol is distilled off as it is formed, if necessary under reduced pressure (Tetrahedron Letters 1961, 448).

Preferred catalysts are perchloric acid, p-toluene-sulphonic acid and hydrochloric acid. Lewis acids, such as $BF_3$-etherate, or salts, such as $CuSO_4$, or $ZnCl_2$, are also suitable. As solvents, for example, halogenated alkanes, methyl acetate, ethyl acetate, dioxane, tetrahydrofuran, benzene or dimethylformamide can be used.

When a compound of Formula 1 is obtained with one of these processes, it can be converted, if desired, into another derivative belonging to the class of compounds defined by Formula 1 in manner known per se.

Compounds of Formula 1, wherein the 6–7 position is saturated, may be converted into the corresponding 6-dehydro derivatives with chloranil or 2,3-dichloro-5,6-dicyano-benzoquinone. When chloranil is used, the reaction is preferably carried out in a solvent boiling between 30° C. and 150° C.; usually the reactants are heated at the boiling temperature of the solution (J.A.C.S. 81 (1959), 5991 and 82 (1960), 4293). Suitable solvents are for example: ethanol, tert-butanol, tert-pentanol, methyl acetate, dioxane, tetrahydrofuran, glacial acetic acid, benzene and acetone. The same solvents can be used when carrying the reaction out with 2,3-dichloro-5,6-dicyanobenzoquinone instead of with chloranil; it is then preferred to conduct the reaction in the presence of a strong acid, such as p-toluene sulphonic acid; the reactants are usually heated at the boiling temperature of the solution (Chem. & Ind. 1962, 211).

Pregnane derivatives of Formula 1, wherein the 1-2 position is saturated, can be converted into the corresponding 1-dehydro-derivatives according to the usual chemical or microbiological processes. Appropriate chemical dehydrogenating agents are 2,3-dichloro-5,6-dicyanobenzoquinone and selenium dioxide. The 1,2-dehydrogenation by means of 2,3-dichloro-5,6-dicyanobenzoquinone can be carried out in the same solvents as used in the 6-7 dehydrogenation with chloranil. It is advisable to add to the reaction mixture a small amount of nitrophenol. Depending on the solvent applied and the starting material used the reaction will take 1.5 to 48 hours to be completed (Proc. Chem. Soc. 1960, 14). Using selenium oxide most suitable solvents are tert-butanol, ethyl acetate or tert-pentanol. The reaction can be accelerated by addition of small amounts of glacial acetic acid. Also this conversion is preferably conducted at the boiling temperature of the solution. The reaction is completed within about 10-48 hours (J.A.C.S. 81 (1959), 1235 and 5991).

The microbiological 1-dehydrogenation can be brought about by appropriate microorganisms, such as *Corynebacterium simplex* (J.A.C.S. 77 (1955), 4184), *Bacillus sphaericus* (Arch. Bioch. 59 (1955), 304) and *Fusarium solani* (Helv. Chim. Acta 38 (1953), 835). The starting material is added to a submerged culture of the utilized microorganism, which is grown in a suitable nutrient medium at an optimal temperature with strong aeration. Instead of this fermentation culture, suspensions of the microorganisms in buffered solutions may be used. The conversion is followed chromatographically and the fermentation fluid is extracted e.g. with dichloromethane, upon complete conversion of the starting material.

Some of the dehydrogenating reactions described above can also be carried out with the 14α,17α-dihydroxypregnane derivatives of Formula 2, wherein the various symbols are as hereinbefore defined and the 1-2 and/or the 6-7 positions are saturated. However, reactions which are conducted under strongly acidic conditions are preferably carried out after the 14α,17α-dihydroxypregnane derivatives have been converted into the corresponding 14α,17α-methylenedioxypregnane derivatives since under these conditions water may be split off at the 14-position.

The 6-dehydrogenation reaction with 2,3-dichloro-5,6-dicyanobenzoquinone which is conducted in the presence of a strong acid is therefore preferably carried out after the 14α- and 17α-hydroxyl groups of the pregnane derivative of Formula 2 have been converted into a 14α,17α-methylenedioxy group according to the processes described above. The same situation arises when other substituents are introduced to prepare the pregnane derivatives of Formula 1. For example, an 11-hydroxyl group can be introduced in manner known per se in a 14α,17α-dihydroxypregnane derivative of formula 2 as well as in a 14α,17α-methylenedioxypregnane derivative of Formula 1 wherein the 11-position is unsubstituted and the other symbols are as thereinbefore defined. The same applies to most of the other reactions described herebelow where, for convenience sake, reference is made only to starting materials wherein the substituted 14α,17α-methylenedioxy group is already present.

A hydroxyl group can be introduced at the 11-position of 14α,17α-methyldioxypregnane derivatives of Formula 1, wherein the 11-position is unsubstituted and the various other symbols are as hereinbefore defined through appropriate microorganisms. Suitable microorganisms are *Curvularia blakesleeana* (J.A.C.S. 77 (1955), 763), *Cunninghamella blakesleeana* (J.A.C.S. 75 (1953), 5369), *Aspergillus ochraceus* (Mycologia 47 (1955), 464) and *Rhizopus migricans* (J.A.C.S. 75 (1953), 408).

In case the starting material is a 21-ester the acyl group may be split off since microorganisms that have hydroxylating properties tend to have hydrolyzing activity also. To accomplish the 11-hydroxylation, the starting material, either suspended in water or dissolved in a suitable solvent, as e.g. acetone or dimethyl formamide, is added to a submerged culture of the microorganism used, which is grown in a suitable nutrient medium at an optimal temperature with strong aeration. The conversion is followed chromatographically. Upon complete converison of the starting material the fermentation fluid is filtered and the filtrate is extracted, e.g. with methyl isobutyl ketone.

The 11-hydroxy pregnane derivatives thus formed can be used as starting materials in the preparation of the corresponding 11-oxo derivatives; the 11-hydroxy compounds, wherein the 21-position should be protected, f.i. by esterification, when R$_4$ represents a hydrogen atom, can be oxidized for example, by means of CrO$_3$ in acetic acid.

The 11-hydroxy pregnane derivatives prepared according to the methods described above can also be used in the preparation of corresponding 9α-halo 11β-hydroxy and 9α,11β-dihalo compounds.

First, an 11-hydroxy pregnane compound of Formula 1, wherein the 9-position is unsubstituted, is converted into the corresponding 9(1)-dehydro derivative by splitting off one molecule of water. Compounds wherein the 11-hydroxyl group is in the β-position are reacted thereto with thionyl chloride or with methane sulphonyl chloride in pyridine (Helv. Chim. Acta 43 (1960), 145 and J. Org. Chem. 25 (1960), 295). When the 11-hydroxyl group of the starting material is in the α-position this hydroxyl group is first converted into an ester group, f.i. with p-toluene sulphonic acid or with methane sulphonic acid. The ester group is then removed again by means of sodium acetate in glacial acetic acid or with lithium chloride in dimethyl formamide whereby, simultaneously, a double bond between the carbon atoms at the positions 9 and 11 is formed (J.A.C.S. 79 (1957), 1130 and Helv. Chim. Acta 42 (1959), 2548).

Preferably, the 21-hydroxyl group in pregnane derivatives of Formula 1 wherein R$_4$ represents a hydroxyl group is protected, f.i. by esterification, during these reactions.

By reacting the 9(11)-dehydropregnane compounds thus formed with f.i. HClO or HBrO the corresponding 9α-halo 11β-hydroxy pregnane derivatives can then be prepared (J.A.C.S. 77 (1955), 4181 and 80 (1958), 2338).

Similarly, the 9(11)-dehydropregnane compounds prepared according to the above process can be converted into the corresponding 9α,11β-dihalo derivatives by addition of two halogen atoms at the double bond 9(11); for example, the 9α,11β-dichloro derivatives can be prepared by reacting the corresponding 9(11)-dehydro compound with N-chlorosuccinimide and hydrogen chloride (Steroids 7 (1966), 234 and J.A.C.S. 82 (1960), 2308 and 4001).

The 14α,17α-methylenedioxypregnane derivatives of Formula 1 wherein R$_1$, R$_2$ and R$_3$ are as hereinbefore defined and R$_4$ represents a hydrogen atom, may be converted into the corresponding 21-esters by one of the usual esterification methods. For example, the carbonic acid esters can be prepared by reaction of the 21-hydroxy derivative with a carbonic acid an hydride or a carbonic acid chloride in pyridine (Helv. Chim. Acta 34 (1951), 354); the phosphoric acid esters can be prepared by reaction with β-cyanoethyl phosphate and dicyclohexyl carbodiimide in pyridine and the sulphuric acid esters by reaction with (CH$_3$)$_3$NSO$_3$ in pyridine (Steroids 6 (1965), 247). Alternatively, the 14α,17α-methylenedioxypregnane derivatives of Formula 1 wherein $R_1$, $R_2$ and $R_3$ are as hereinbefore defined and $R_4$ represents an acyl group, may be converted into the corresponding 21-hydroxyl derivatives by methods known per se, for instance, by alcoholysis by means of sodium methanolate and methanol.

When preparing 14α,17α-methylenedioxypregnane derivatives of Formula 1 from the corresponding 14α,17α-dihydroxy compounds of Formula 2, theoretically speaking, a mixture of two stereoisomers can be expected, since bridging the 14α- and 17α-oxygen atoms by a substituted methylene group introduces a new asymmetric carbon atom. Up to now the occurrence of two isomers has not been demonstrated however. As determined from the data of paper and thin layer chromatography, melting points, optical rotations and N.M.R. spectra of the products obtained, two isomers do not appear to have been formed.

Typical compounds of the present invention are:

11β,21-dihydroxy-14α,17α-ethylidenedioxy-4-pregnane-3,20-dione

11β,21-dihydroxy-14α,17α-ethylidenedioxy-4-pregnene-3,20-dione 21-acetate

11β,21-dihydroxy-14α,17α-(3'-methylbutylidenedioxy)-4-pregnene-3,20-dione

11β,21-dihydroxy-14α,17α-hexylidenedioxy-4-pregnene-3,20-dione 21-acetate

11β,21-dihydroxy-14α,17α-(2'-pentenylidenedioxy)-4-pregnene-3,20-dione

11β,21-dihydroxy-14α,17α-(4'-methoxycarbonylbutylidenedioxy)-4-pregnene-3,20-dione 11β,21-dihydroxy-14α,17α-benzylidenedioxy-4-pregnene-3,20-dione 21-acetate 11β,21-dihydroxy-14α,17α-(2'-phenylethylidenedioxy)-4-pregnene-3,20-dione 11β,21-dihydroxy-14α,17α-(2'-furylmethylenedioxy)-4-pregnene-3,20-dione 21-isonicotinate 11β,21-dihydroxy-14α,17α-(2'-furylmethylenedioxy)-4-pregnene-3,20-dione 21-(3'-phenyl)propionate 11β,21-dihydroxy-14α,17α-(2'-furylmethylenedioxy)-4-pregnene-3,20-dione 21-(1'-adamantyl)carboxylate 11β,21-dihydroxy-14α,17α-(2'-furylmethylenedioxy)-4-pregnene-3,20-dione 21-pivalate 11β,21-dihydroxy-14α,17α-(2'-furylmethylenedioxy)-4-pregnene-3,20-dione 21-decanoate 11β,21-dihydroxy-14α,17α-cyclopropylmethylenedioxy-4-pregnene-3,20-dione 21-isonicotinate 11β,21-dihydroxy-14α,17α-cyclopropylmethylenedioxy-4-pregnene-3,20-dione 21-(3'-phenyl)propionate 11β,21-dihydroxy-14α,17α-cyclopropylmethylenedioxy-4-pregnene-3,20-dione 21-(1'-adamantyl)carboxylate 11β,21-dihydroxy-14α,17α-cyclopropylmethylenedioxy-4-pregnene-3,20-dione 21-pivalate 11β,21-dihydroxy-14α,17α-cyclopropylmethylenedioxy-4-pregnene-3,20-dione 21-decanoate 21-hydroxy-14α,17α-ethylidenedioxy-9α,11β-dichloro-1,4-pregnadiene-3,20-dione 21-hydroxy-14α,17α-ethylidenedioxy-9α,11β-dichloro-1,4-pregnadiene-3,20-dione 21-isonicotinate 21-hydroxy-14α,17α-ethylidenedioxy-9α,11β-dichloro-1,4-pregnadiene-3,20-dione 21-(3'-phenyl)propionate 21-hydroxy-14α,17α-ethylidenedioxy-4-pregnene-3,11,20-trione 21-pivalate 21-hydroxy-14α,17α-ethylidenedioxy-4-pregnene-3,11,20-trione 21-(1'-adamantyl)carboxylate 11β,21-dihydroxy-9α-chloro-14α,17α-ethylidenedioxy-1,4-pregnadiene-3,20-dione 11β,21-dihydroxy-9α-chloro-14α,17α-ethylidenedioxy-1,4-pregnadiene-3,20-dione 21-isonicotinate The 14α,17α-dihydroxypregnene compounds of Formula 2 which are used as starting material in the processes of the invention are known compounds or can be prepared according to methods known for the preparation of analogous compounds.

For example the compound of Formula 2 wherein $R_2$ and $R_3$ each represents an α-hydrogen atom and $R_4$ represents a hydrogen atom, i.e. 14α,17α,21-trihydroxy-4-pregnene-3,20-dione, can be obtained by microbiological conversion of Reichstein's Compound S, i.e. 17α,21-dihydroxy-4-pregnene-3,20-dione. Suitable microorganisms are for example *Absidia regnieri* (Chem. & Pharm. Bu–1. Japan 9 (1961), 59), *Cunninghamella blakesleeana* (Vit. & Horm. 14 (1956), 359) and *Helminthosporium avenae* (J. Agr. Chem. Soc. Japan 34 (1960), 762 and 35 (1961), 521).

Another suitable starting material in the process of the invention is the known compound 14α-hydroxy-hydrocortisone (Dutch Pat. No. 95,601). The corresponding 11α-isomer of 14α-hydroxy hydrocortisone can be obtained by microbiological conversion of the derivative 14α-hydroxy-Compound S, the preparation of which has been indicated above. Upon treatment of this derivative with f.i. *Aspergillus ochraceus* there is obtained the desired compound, i.e. 11α,14α,17α,21-tetrahydroxy-4-pregnene-3,20-dione.

These 14α,17α-dihydroxypregnene compounds thus prepared can be converted again in other derivatives of Formula 2, generally in the same manner as described above for the corresponding conversions of the 14α,17α-methylenedioxypregnene compounds of Formula 1.

As already stated above the various substitution and dehydrogenation reactions described hereinbefore for the conversion of compounds of Formula 1 to other compounds of this formula usually can also be applied to 14α,17α-dihydroxypregnene derivatives of Formula 2. In some reactions it is preferred to protect the 21-hydroxyl group, f.i. by esterification, before carrying out the substitution or dehydrogenation reaction.

The following examples further illustrate the best mode currently contemplated for carrying out the present invention but must not be construed as limiting the scope thereof in any manner whatsoever.

EXAMPLE 1

A mixture of 5.0 g. of 14α-hydroxy-hydrocortisone 21-acetate, 5 ml. of paraldehyde, 1.3 ml. of perchloric acid (70%), 3 ml. of water and 30 ml. of purified dioxane was kept for 46 hours at room temperature. To the reaction mixture 500 ml. of methyl isobutyl ketone were added and the resulting solution was successively washed with 100 mmole of a solution of potassium carbonate in water and subsequently three times with 50 ml. of water. The solvent was completely removed by distillation under reduced pressure. The residue was crystallized from methanol, yielding 3.2 g. of 11β,21-dihydroxy 14α,17α-ethylidenedioxy-4-pregnene-3,20-dione 21-acetate. Recrystallization from ethyl acetate/heptane gave a pure product.

Melting point: 183° C.; $[\alpha]_D = +190°$ (c.=0.5; in $CHCl_3$)

$\lambda_{max}$ (in $CH_3OH$) = 242 mμ; $E^{1\%}_{1cm.} = 381$

I.R. (in $CHCl_3$) $\nu_{max}$=3610, 1745, 1730, 1663, 1615, 1138 and 1110 cm.$^{-1}$ N.M.R. (in $CDCl_3$) δ=1.11, 1.30 (doublet), 1.42, 2.15, 4.47, 4.84, 5.13 (quadruplet), 5.67 p.p.m.

*Elementary analysis.*—Calculated for $C_{25}H_{34}O_7$ (percent): C, 67.26; H, 7.62. Found (percent): C, 67.56 and 67.59; H, 7.83 and 7.77.

EXAMPLE 2

In an analogous way to the procedure described in Example 1, 14α-hydroxy-hydrocortisone 21-acetate was converted with cyclopropyl formaldehyde to 11β,21-dihydroxy-14α,17α-cyclopropylmethylenedioxy - 4 - pregnene-3,20-dione 21-acetate.

Melting point: 120–135° C.; $[\alpha]_D = +146°$ (c.=0.5; in $CHCl_3$)

$\lambda_{max}$ (in $CH_3OH$) = 240 mμ; $E^{1\%}_{1cm.} = 305$

I.R. (in CHCl₃) ν_max=3612, 1745, 1730, 1660, 1615, 1130, 1102, 1012 cm.⁻¹

N.M.R. (in CDCl₃) δ=0.3-0.6 (multiplet), 1.12, 1.44, 2.15, 4.50, 4.67 (doublet), 4.90, 5.72 p.p.m.

*Elementary analysis.*—Calculated for $C_{27}H_{36}O_7$ (percent): C, 68.64; H, 7.63. Found (percent): C, 68.75 and 68.71; H, 7.51 and 7.55.

EXAMPLE 3

In an analogous way to the procedure described in Example 1, 14α-hydroxy-hydrocortisone 21-acetate was converted with propanal to 11β,21-dihydroxy-14α,17α-propylidenedioxy-4-pregnene-3,20-dione 21-acetate Melting point: 110-112° C.; $[\alpha]_D = +173°$ (c.=0.5; in CHCl₃)

$\lambda_{max}$ (in CH₃OH) = 242 mμ; $E^{1\%}_{1cm.} = 296$

I.R. (in CHCl₃) ν_max=3610, 1743, 1729, 1662, 1612, 1140 cm.⁻¹

N.M.R. (in CDCl₃) δ=0.92 (triplet), 1.12, 1.45, 2.16, 4.45, 4.86, 4.91 (triplet), 5.68 p.p.m.

*Elementary analysis.*—Calculated for $C_{26}H_{36}O_7$ (percent): C, 67.83; H, 7.83. Found (percent): C, 67.87 and 67.89; H, 8.00 and 8.00.

EXAMPLE 4

In an analogous way to the procedure described in Example 1, 14α-hydroxy-hydrocortisone 21-acetate was converted with butanal to 11β,21-dihydroxy-14α,17α-butylidenedioxy-4-pregnene-3,20-dione 21-acetate.

Melting point: 95-101° C.; $[\alpha]_D = +174°$ (c.=0.5; in CHCl₃)

$\lambda_{max}$ (in CH₃OH) = 242 mμ; $E^{1\%}_{1cm.} = 336$

I.R. (in CHCl₃) ν_max=3613, 1745, 1730, 1665, 1618, 1375, 1128 cm.⁻¹

N.M.R. (in CDCl₃) δ=0.90 (triplet), 1.12, 1.43, 1.58, 2.16, 4.47, 4.83, 4.96 (triplet), 5.67 p.p.m.

*Elementary analysis.*—Calculated for $C_{27}H_{38}O_7$ (percent): C, 68.35; H, 8.02. Found (percent): C, 68.45 and 68.52; H, 8.06 and 8.04.

EXAMPLE 5

In an analogous way to the procedure described in Example 1, 14α-hydroxy-hydrocortisone 21-acetate was converted with pentanal to 11β,21-dihydroxy-14α,17α-pentylidenedioxy-4-pregnene-3,20-dione 21-acetate.

Melting point: 106.5-108° C.; $[\alpha]_D = +156°$ (c.=0.5; in CHCl₃)

$\lambda_{max}$ (in CH₃OH) = 242 mμ; $E^{1\%}_{1cm.} = 283$

I.R. (in CHCl₃) ν_max=3612, 1743, 1730, 1664, 1614, 1130 cm.⁻¹

N.M.R. (in CDCl₃) δ=0.90 (triplet), 1.11, 1.43, 2.16, 4.45, 4.84, 5.69 p.p.m.

*Elementary analysis.*—Calculated for $C_{28}H_{40}C_7$ (percent): C, 68.85; H, 8.20. Found (percent): C, 68.61 and 68.63; H, 8.16 and 8.14.

EXAMPLE 6

A mixture of 7.2 g. of 14α-hydroxy-hydrocortisone 21-acetate, 40 ml. of nonanal, 160 ml. of methylene chloride and 2 ml. of perchloric acid (70%) was stirred for 6 hours and refluxed. The reaction mixture was successively washed with solutions of sodium sulphite and of sodium carbonate in water and with water. The methylene chloride layer thus purified was evaporated to dryness and the residue was crystallized from diethyl ether. The precipitate consisting of 3.9 g. of the by-product 14-dehydro-hydrocortisone 21-acetate was filtered off. Upon evaporation of the filtrate the residue was crystallized from heptane. Thus 1.2 g. of nearly pure 11β,21-dihydroxy-14α,17α-nonylidenedioxy-4-pregnene-3,20-dione 21-acetate was obtained. Recrystallization from ethanol yielded 0.60 g. of the pure product.

Melting point: 158-161° C.; $[\alpha]_D = +165°$ (c.=0.5; in CHCl₃)

$\lambda_{max}$ (in CH₃OH) = 241 mμ; $E^{1\%}_{1cm.} = 262$

I.R. (in CHCl₃) ν_max=3612, 1745, 1738, 1665, 1618, 1130 cm.⁻¹

N.M.R. (in CDCl₃) δ=0.88 (triplet), 1.12, 1.29, 1.44, 2.17, 4.50, 4.85, 4.96 (triplet), 5.70 p.p.m.

*Elementary analysis.*—Calculated for $C_{32}H_{48}O_7$ (percent): C, 70.59; H, 8.82. Found (percent): C, 70.56 and 70.51; H, 8.85 and 8.90.

EXAMPLE 7

A mixture of 5.0 g. of 14α-hydroxy-hydrocortisone 21-acetate, 5.0 ml. of dimethylsulphoxide, 1.6 ml. of perchloric acid (70%) and 40 ml. of p-isopropylbenzaldehyde was stirred for 7 days at room temperature. The reaction mixture was diluted with 150 ml. of methylene chloride and was successively washed with solutions of sodium bisulphite and of sodium carbonate in water and with water. The organic layer was evaporated to dryness. The residue was subjected to column chromatography (silica gel, eluent benzene/acetone 3:1). 0.50 g. of nearly pure 11β,21-dihydroxy-14α,17α-(p-isopropylbenzylidenedioxy) - 4 - pregnene-3,20-dione 21-acetate was obtained. Chromatography on aluminium oxide, activity III (eluent benzene/acetone 7:1) was applied. The fractions containing the appropriate derivative were evaporated to dryness and the residue was crystallized from a mixture of methylene chloride and petroleum ether (B.P. 40-60° C.): 0.25 g. of pure product precipitated.

Melting point: 144-146° C.; $[\alpha]_D = +157°$ (c.=0.5; in CHCl₃)

$\lambda_{max}$ (in CH₃OH) = 241 mμ; $E^{1\%}_{1cm.} = 240$; 217 mμ; $E^{1\%}_{1cm.} = 245$ I.R. (in CHCl₃) ν_max=3610, 1742, 1729, 1662, 1614 cm.⁻¹

N.M.R. (in CDCl₃) δ=1.20, 1.27 (doublet), 1.46, 2.15, 4.50, 4.88, 5.67, 5.92, 7.31 p.p.m.

*Elementary analysis.*—Calculated for $C_{33}H_{42}O_7$ (percent): C, 72.00; H, 7.64. Found (percent): C, 71.91 and 71.89; H, 7.70 and 7.72.

EXAMPLE 8

A mixture of 8.0 g. of 14α-hydroxy-hydrocortisone 21-acetate, 24 g. of 3-(methoxycarbonyl)-propanal, 1.0 ml. of perchloric acid (70%) and 80 ml. of methylene chloride was kept for 3 days at room temperature. The reaction mixture was worked up as usual and the residue obtained was purified by chromatography (aluminium oxide, activity III, eluent benzene/ethyl acetate 2:1). 0.75 g. of 11β,21-dihydroxy-14α,17α-(3' - methoxycarbonylpropylidenedioxy)-4-pregnene-3,20-dione 21-acetate was isolated.

Melting point: 128-131° C.; $[\alpha]_D = +171°$ (c.=0.5; in CHCl₃)

$\lambda_{max}$ (in CH₃OH) = 242 mμ; $E^{1\%}_{1cm.} = 298$

I.R. (in CHCl₃) ν_max=3612, 1730, 1663, 1615, 1140, 1040 cm.⁻¹

N.M.R. (in CDCl₃) δ=1.13, 1.44, 2.18, 3.68, 4.50, 4.83, 5.04 (triplet), 5.68 p.p.m.

*Elementary analysis.*—Calculated for $C_{28}H_{38}O_9$ (percent): C, 64.86; H, 7.34. Found (percent): C, 65.00 and 65.01; H, 7.35 and 7.34.

EXAMPLE 9

A mixture of 5.0 g. of 14α-hydroxy-hydrocortisone 21-acetate, 10 ml. of cortonaldehyde, 0.25 ml. of perchloric acid (70%) and 70 ml. of dioxane was kept for 29 hours at room temperature. 250 ml. of methylisobutyl ketone were added. The solution was washed with 50 ml. of a molar potassium carbonate solution in water and with water till neutral. The organic layer was evaporated to dryness and the oily residue was crystallized from a mixture of ethyl acetate and heptane. 1.1 g. of 14-dehydrohydrocortisone 21-acetate precipitated. The mother liquid was concentrated to a small volume and the residue was subjected to chromatography (100 g. of aluminum oxide, activity III, eluent 5% acetone in benzene). The fractions 3–12 (each consisting of 25 ml.) were combined and evaporated to dryness. The residue was crystallized from a mixture of acetone and benzene: yield: 1.5 g. of 11β,21-dihydroxy 14α,17α-(2′-butenylidenedioxy)-4-pregnene-3,20-dione 21-acetate.

Melting point: 130–133° C.; $[\alpha]_D = +159°$ (c.=0.5; in $CHCl_3$)

$\lambda_{max}$ (in $CH_3OH$) = 242 m$\mu$; $E^{1\%}_{1 cm.}$ = 313

I.R. (in $CHCl_3$) $\nu_{max}$=3612, 3092, 1743, 1728, 1662, 1615, 1935 cm.$^{-1}$ N.M.R. (in $CDCl_3$) δ=1.12, 1.43, 1.59, 1.73 (doublet), 2.15, 4.45, 4.86, 5.0–6.0 (multiplet), 5.62 p.p.m.

*Elementary analysis.*—Calculated for $C_{27}H_{36}O_7$ (percent): C, 68.64; H, 7.63. Found (percent): C, 68.80 and 68.74; H, 7.78 and 7.70.

EXAMPLE 10

In an analogous way to the procedure described in Example 9, 14α-hydroxy-hydrocortisone 21-acetate was converted with furfural to 11β,21-dihydroxy 14α,17α-(2′-furylmethylenedioxy)-4-pregnene-3,20-dione 21-acetate.

Melting point: 122–123° C.; $[\alpha]_D = +161°$ (c.=0.5; in $CHCl_3$)

$\lambda_{max}$ ($CH_3OH$) = 217 and 242 m$\mu$; $E^{1\%}_{1 cm.}$ = 290 and 275

I.R. (in $CHCl_3$) $\nu_{max}$=3612, 1743, 1729, 1660, 1613, 1130 cm.$^{-1}$

N.M.R. (in $CDCl_3$) δ=1.17, 1.45, 2.14, 4.52, 4.85, 5.64, 5.95, 6.40 and 7.34–7.47 (multiplet) p.p.m.

*Elementary analysis.*—Calculated for $C_{28}H_{34}O_8$ (percent): C, 67.47; H, 6.83. Found (percent): C, 68.67 and 68.63; H, 6.71 and 6.74.

EXAMPLE 11

In an analogous way to the procedure described in Example 9, 14α-hydroxy-hydrocortisone 21-acetate was converted with p-chlorobenzaldehyde to 11β,21-dihydroxy-14α,17α - (p-chlorobenzylidenedioxy) - 4-pregnene-3,20-dione 21-acetate.

Melting point: 231–237° C.; $[\alpha]_D = +174°$ (c.=0.5; in $CHCl_3$)

$\lambda_{max}$ (in $CH_3OH$) = 220 and 242 m$\mu$; $E^{1\%}_{1 cm.}$ = 304 and 283

I.R. (in $CHCl_3$) $\nu_{max}$=3612, 1742, 1730, 1662, 1615, 1600, 1489, 1090 cm.$^{-1}$ N.M.R. (in $CDCl_3$) δ=1.20, 1.46, 2.17, 4.48, 4.87, 5.68, 5.93, 7.37 p.p.m.

*Elementary analysis.*—Calculated for $C_{30}H_{35}O_7Cl$ (percent): C, 66.37; H, 6.47; Cl, 6.53. Found (percent): C, 66.39 and 66.50; H, 6.60 and 6.58; Cl, 6.70 and 6.53.

EXAMPLE 12

In an analogous way to the procedure described in Example 9, 14α-hydroxy-hydrocortisone 21-acetate was converted with p-methoxybenzaldehyde to 11β,21-dihydroxy 14α,17α-(p-methoxybenzylidenedioxy) 4-pregnene-3,20-dione 21-acetate.

Melting point: 184.5–197° C.; $[\alpha]_D = +174°$ (c.=0.5; in $CHCl_3$)

$\lambda_{max}$ (in $CH_3OH$) = 228 and 240 m$\mu$; $E^{1\%}_{1 cm.}$ = 448 and 312

I.R. (in $CHCl_3$) $\nu_{max}$=3611, 2843, 1745, 1729, 1663, 1612, 1600, 1578, 1505, and 1130 cm.$^{-1}$ N.M.R. (in $CDCl_3$) δ=1.20, 1.46, 1.70, 2.15, 3.82, 4.50, 4.87, 5.64, 5.90, 6.92 and 7.32 (AB-spectrum) p.p.m.

*Elementary analysis.*—Calculated for $C_{31}H_{38}O_8$ (percent): C, 69.15; H, 7.06. Found (percent): C, 69.25 and 69.24; H, 7.21 and 7.26.

EXAMPLE 13

In an analogous way to the procedure described in Example 9, 14α-hydroxy hydrocortisone 21-acetate was converted with α-naphthaldehyde to 11β,21-dihydroxy 14α,17α-(1′-naphthylmethylenedioxy) 4-pregnene-3,20-dione 21-acetate.

Melting point: 175–180° C.; $[\alpha]_D = +132°$ (c.=0.5; in $CHCl_3$)

$\lambda_{max}$ (in $CH_3OH$) = 223, 238, 242, 270, 280 and 290 m$\mu$; $E^{1\%}_{1 cm.}$ = 1576, 259, 267, 96, 112, 85

I.R. (in $CHCl_3$) $\nu_{max}$=3612, 1744, 1730, 1663, 1615, 1130, 1110 cm.$^{-1}$ N.M.R. (in $CDCl_3$) δ=1.24, 1.45, 1.87, 2.12, 4.45, 4.8 and 4.9 (AB-spectrum) 5.62 and 7.1–8.1 (multiplet) p.p.m.

*Elementary analysis.*—Calculated for $C_{34}H_{38}O_7$ (percent): C, 73.12; H, 6.81. Found (percent): C, 73.35 and 73.40; H, 6.94 and 6.99.

EXAMPLE 14

In an analogous way to the procedure described in Example 9, 14α-hydroxy-hydrocortisone 21-acetate was converted with cyclohexylformaldehyde to 11β,21-dihydroxy - 14α,17α-(cyclohexylmethylenedioxy)-4-pregnene-3,20-dione 21-acetate.

Melting point: 139–141° C.; $[\alpha]_D = +177°$ (c.=0.5; in $CHCl_3$)

$\lambda_{max}$ (in $CH_3OH$) = 241 m$\mu$; $E^{1\%}_{1 cm.}$ = 326

I.R. (in $CHCl_3$) $\nu_{max}$=3610, 1743, 1728, 1660, 1614, 1130 cm.$^{-1}$

N.M.R. (in $CDCl_3$) δ=1.12, 1.44, 2.16, 4.43, 4.67, 4.83, 5.68 p.p.m.

*Elementary analysis.*—Calculated for $C_{30}H_{42}O_7$ (percent): C, 70.04; H, 8.17. Found (percent): C, 69.82 and 69.80; H, 8.28 and 8.32.

EXAMPLE 15

In an analogous way to the procedure described in Example 9, 14α-hydroxy hydrocortisone 21-acetate was converted with 3-phenylpropanal to 11β,21-dihydroxy 14α,17α-(3′-phenylpropylidene dioxy) 4-pregnene-3,20-dione 21-acetate.

Melting point: 113–116° C.; $[\alpha]_D = +142°$ (c.=0.5; in $CHCl_3$)

$\lambda_{max}$ (in $CH_3OH$) = 242 m$\mu$; $E^{1\%}_{1 cm.}$ = 270

I.R. (in $CHCl_3$) $\nu_{max}$=3615, 1745, 1730, 1662, 1490, 1450, 1130 cm.$^{-1}$ N.M.R. (in $CDCl_3$) δ=1.12, 1.43, 2.17, 4.50, 4.82, 4.97 (triplet), 5.68, 7.22 p.p.m.

*Elementary analysis.*—Calculated for $C_{32}H_{40}O_7$ (percent): C, 71.64; H, 7.46. Found (percent): C, 71.69 and 71.63; H, 7.56 and 7.51.

EXAMPLE 16

In an analogous way to the procedure described in Example 9, 14α-hydroxy-hydrocortisone 21-acetate was converted with 2-thiophenealdehyde to 11β,21-dihydroxy 14α,17α-(2′-thienylmethylenedioxy) 4-pregnene-3,20-dione 21-acetate.

Melting point: 131–134° C.; $[\alpha]_D = +198°$ (c.=0.5; in $CHCl_3$)

$\lambda_{max}$ (in $CH_3OH$) = 238 m$\mu$; $E^{1\%}_{1 cm.}$ = 384

I.R. (in $CHCl_3$) $\nu_{max}$=3610, 1740, 1728, 1660, 1612 cm.$^{-1}$

N.M.R. (in $CDCl_3$) δ=1.19, 1.45, 2.13, 4.5, 4.85, 5.60, 6.20, 7.3–7.5 (multiplet) p.p.m.

*Elementary analysis.*—Calculated for $C_{28}H_{34}O_7S$ (percent): C, 65.37; H, 6.61; S, 6.23. Found (percent): C, 65.46 and 65.50; H, 6.73 and 6.65; S, 6.21 and 6.21.

EXAMPLE 17

In an analogous way to the procedure described in Example 9, 14α-hydroxy-hydrocortisone 21-acetate was converted with isovaleraldehyde to 11β,21-dihydroxy-14α, 17α - (3' - methylbutylidenedioxy)-4-pregnene-3,20-dione 21-acetate.

Melting point: 148–149° C.; $[\alpha]_D = +179°$ (c.=0.5; in $CHCl_3$)

$\lambda_{max}$ (in $CH_3OH$) = 242 m$\mu$; $E_{1\,cm.}^{1\%} = 295$

I.R. (in $CHCl_3$) $\nu_{max} = 3612$, 1743, 1728, 1665, 1615, 1370, 1128 cm.$^{-1}$
N.M.R. (in $CDCl_3$) $\delta = 0.91$ (doublet), 1.10, 1.43, 2.17, 4.48, 4.83, 5.01 (triplet), 5.67 p.p.m.

*Elementary analysis.*—Calculated for $C_{28}H_{40}O_7$ (percent): C, 68.85; H, 8.20. Found (percent): C, 68.90 and 68.84; H, 8.26 and 8.24.

EXAMPLE 18

In an analogous way to the procedure described in Example 9, 14α-hydroxy-hydrocortisone 21-acetate was converted with benzaldehyde to 11β,21-dihydroxy-14α,17α-benzylidenedioxy-4-pregnene-3,20-dione 21-acetate.

Melting point: 186–189° C.; $[\alpha]_D = +170°$ (c.=0.5; in $CHCl_3$)

$\lambda_{max}$ (in $CH_3OH$) = 240 m$\mu$; $E_{1\,cm.}^{1\%} = 310$

I.R. (in $CHCl_3$) $\nu_{max} = 3612$, 1745, 1732, 1663, 1617, 1028 cm.$^{-1}$
N.M.R. (in $CDCl_3$) $\delta = 1.21$, 1.48, 2.14, ca. 4.5, 4.91, 5.62, 5.93, 7.35–7.45 (multiplet) p.p.m.

*Elementary analysis.*—Calculated for $C_{30}H_{36}O_7$ (percent): C, 70.87; H, 7.09. Found (percent): C, 70.92 and 70.96; H, 7.10 and 7.15.

EXAMPLE 19

A solution of 22.0 g. of 11β,21-dihydroxy-14α,17α-ethylidenedioxy - 4 - pregnene-3,20-dione 21-acetate prepared according to the process of Example 1 and 14.3 g. of 2,3-dichloro 5,6-dicyanobenzoquinone in 200 ml. of dioxane was stirred at 95° C. After 1.5 h. the precipitate formed; 12.9 g. of the benzoquinone, was filtered off and was thoroughly washed with methylene chloride. The filtrate was stirred for 30 min. with 40 g. of aluminum oxide that had been acidified (30 ml. of acetic acid (10%)/kg. aluminum oxide. The aluminum oxide was filtered off and the filtrate was again stirred with 40 g. of acidified aluminium oxide. This procedure was repeated 5 times, during the last of which 6 g. of charcoal was added. A solution of the steroid, thus purified, in methylene chloride and dioxane was evaporated to dryness. The residue was crystallized from diethyl ether. 14.4 g. of 11β,21-dihydroxy-14α,17α - ethylidenedioxy - 1,4-pregnadiene-3,20-dione 21-acetate precipitated, which was recrystallized from a mixture of 200 ml. of methyl isobutylketone and 100 ml. of heptane, yielding 10.5 g. of pure 11β,21-dihydroxy-14α,17α-ethylidenedioxy-1,4-pregnadiene-3,20-dione 21-acetate.

Melting point: 115–119° C.; $[\alpha]_D = +146°$ (C.=0.5; in $CHCl_3$)

$\lambda_{max}$ (in $CH_3OH$) = 242 m$\mu$; $E_{1\,cm.}^{1\%} = 288$

I.R. (in $CHCl_3$) $\nu_{max} = 3610$, 1745, 1730, 1658, 1622, 1602, 1109 cm.$^{-1}$ N.M.R. (in $CDCl_3$) $\delta = 1.16$, 1.28 (doublet), 1.47, 2.16, 4.5, 4.88, 5.17 (quadruplet), 6.04, ca. 6.32 and ca. 7.41 (multiplets) p.p.m.

*Elementary analysis.*—Calculated for $C_{25}H_{32}O_7$ (percent): C, 67.57%; H, 7.21%. Found (percent): C, 67.59 and 67.55%; H, 7.24 and 7.18.

EXAMPLE 20

A suspension of 2.0 g. of 11β,21-dihydroxy-14α,17α-ethylidenedioxy-4-pregnene-3,20-dione 21-acetate prepared according to the process of Example 1, 6.0 g. of chloranil and 140 ml. of tert. butanol was stirred and refluxed for 1.5 h. The reaction mixture was then stirred for 15 hours at room temperature and was filtered. The filtrate was evaporated to dryness and the residue was purified by column chromatography, adsorbent: aluminum oxide, activity III, eluent: 4% acetone in benzene. After evaporation to dryness of the appropriate fractions the residue crystallized from diethyl ether, yield: 0.56 g. of 11β,21-dihydroxy-14α,17α-ethylidenedioxy-4,6- pregnadiene-3,20-dione 21-acetate.

Melting point: 204–205° C., $[\alpha]_D = +221°$ (c.=0.5; in $CHCl_3$)

$\lambda_{max}$ (in $CH_3OH$) = 282 m$\mu$; $E_{1\,cm.}^{1\%} = 570$

I.R. (in $CHCl_3$) $\nu_{max} = 3610$, 1740, 1728, 1650, 1618, 1580, 1403, 1109 cm.$^{-1}$
N.M.R. (in $CDCl_3$) $\delta = 1.17$, 1.30 (doublet), 1.37, 2.18, 4.48, 4.85, 5.20 (quadruplet), 5.63, 6.15 p.p.m.

*Elementary analysis.*—Calculated for $C_{25}H_{32}O_7$ (percent): C, 67.87; H, 6.79. Found (percent): C, 67.62 and 67.51; H, 7.28 and 7.22.

EXAMPLE 21

In a similar way to the procedure described in Example 19, 11β,21-dihydroxy-14α,17α-ethylidenedioxy-1,4,6- pregnatriene-3,20-dione 21-acetate was obtained from 11β, 21 - dihydroxy - 14α,17α-ethylidenedioxy-4,6-pregnadiene-3,20-dione 21-acetate (prepared according to the process of Example 20) by reaction with 2,3-dichloro-5,6-dicyanobenzoquinone.

Melting point: 196°–188° C.; $[\alpha]_D = +154°$ (c.=0.5); in $CHCl_3$)

$\lambda_{max}$ (in $CH_3OH$) = 220, 254 and 298 m$\mu$; $E_{1\,cm.}^{1\%} = 298$ 222 and 287

I.R. (in $CHCl_3$) $\nu_{max} = 3610$, 1740, 1728, 1648, 1627, 1600, 1580 cm.$^{-1}$
N.M.R. (in $CDCl_3$) $\delta = 1.18$, 1.25 (doublet), 1.43, 2.17, 4.52, 4.85, 5.18 (quadruplet), 5.95–6.40 (multiplets) p.p.m.

*Elementary analysis.*—Calculated for $C_{25}H_{30}O_7$ (percent: C, 67.87; H, 6.79. Found (percent): C, 67.62 and 67.58; H, 6.83 and 6.88.

EXAMPLE 22

(A) A solution of 4.3 g. of 11β,21-dihydroxy-14α,17α-ethylidenedioxy-1,4-pregnadiene-3,20 - dione 21 - acetate prepared according to the process of Example 19 in 30 ml. of tetrahydrofuran and 22 ml. of pyridine was cooled down to −10° C. With stirring and continued cooling 2.9 ml. of thionyl chloride were cautiously added dropwise. The ensuing suspension was rapidly brought to 0° C. After 15 minutes the reaction mixture was poured into 600 ml. of water, to which 5 g. of sodium chloride had been added. 4.0 g. of amorphous 21-hydroxy-14α-17α - ethylidenedioxy - 1,4,9(11)-pregnatriene-3,20-dione 21-acetate were obtained.

$\lambda_{max}$ (in $CH_3OH$) = 239 m$\mu$; $E_{1\,cm.}^{1\%} = 350$

I.R. (in $CHCl_3$) $\nu_{max} = 1749$, 1732, 1665, 1625, 1609, 1409, 1110 cm.$^{-1}$ (B) A solution of 1.0 g. of the compound thus obtained and 0.5 ml. of perchloric acid (0.68 N) in 10 ml. of dioxane (95%) was treated with 0.62 g. of dibromantine. This reaction mixture was stirred for 2.5 hours in the dark at room temperature and was then poured into a solution of 1.7 g. of sodium pyrosulphite in 120 ml. of water. 1.2 g. of a solid precipitated which, upon crystallization from methanol, yielded 0.2 g. of pure 11β,21- dihydroxy - 9α - bromo-14α,17α-ethylidenedioxy-1,4-pregnadiene-3,20-dione 21-acetate.

Melting point: 172°–173° C. (decomposition); [α]$_D$= +162° (c.=0.5; in CHCl$_3$)

λ$_{max}$ (in CH$_3$OH) =241 mμ; E$^{1\%}_{1cm.}$=242

I.R. (in CHCl$_3$) ν$_{max}$=3608, 1745, 1731, 1662, 1122–1112 cm.$^{-1}$

N.M.R. (in CDCl$_3$) δ=1.16, 1.37 (doublet), 1.74, 2.17, 3.4, 4.92, 5.22 (quadruplet), 6.05, 6.30 (doublet), 7.53 (doublet) p.p.m.

*Elementary analysis.*—Calculated for C$_{25}$H$_{31}$O$_7$Br (percent): C, 57.36; H, 5.93; Br, 15.30. Found (percent): C, 57.26 and 57.29; H, 5.82 and 5.79; Br, 15.19 and 15.22%.

EXAMPLE 23

To an ice-cooled solution of 5.5 g. of 21-hydroxy-14α,17α - ethylidenedioxy - 1,4,9(11)-pregnatriene-3,20-dione 21-acetate prepared according to the process of Example 22A and 22 g. of lithium chloride in 220 ml. of acetic acid 1.9 g. of N-chlorosuccinimide and 3.9 ml. of a 4 N solution of hydrochloric acid in dioxane were successively added. The reaction mixture was stirred for an additional hour at 0° C. and was poured into 1.75 l of water. The solid precipitated was crystallized from a mixture of methanol/water. 2.9 of crystalline material thus obtained were purified by chromatography on a column of 150 g. of silica gel, eluent 10% diethyl ether in benzene. Upon evaporation to dryness of the appropriate fractions a residue was obtained which crystallized from diethyl ether; yield 1.0 g. of 21-hydroxy-14α,17α-ethylidenedioxy-9α,11β-dichloro 1,4-pregnadiene-3,20-dione 21-acetate.

Melting point: 195°–196.5° C.; [α]$_D$=+223° (c.=0.5; in CHCl$_3$)

λ$_{max}$ (in CH$_3$OH) =238 mμ, shoulder at 265 mμ; E$^{1\%}_{1cm.}$= 295 and 100

I.R. (in CHCl$_3$) ν$_{max}$=1743, 1730, 1665, 1625, 1608, 1402, 1110 cm.$^{-1}$ N.M.R. (in CDCl$_3$) δ=1.23, 1.37 (doublet), 1.71, 2.19, 3.3–3.7 (multiplet), 4.87, 5.11 (quadruplet), 6.09, 6.40 and 7.40 (AB-quartet) p.p.m.

*Elementary analysis.*—Calculated for C$_{25}$H$_{30}$O$_6$Cl$_2$ (percent): C, 60.36; H, 6.04; Cl, 14.28. Found (percent): C, 60.11 and 60.08; H, 6.16 and 6.20; Cl, 14.39 and 14.37.

EXAMPLE 24

A nitrogen-flushed solution of 15.6 g. of 11β,21-dihydroxy-14α,17α-ethylidenedioxy-4-pregnene - 3,20 - dione 21-acetate prepared according to the process of Example 1 in a mixture of 125 ml. of methylene chloride and 125 ml. of methanol was treated with 1.4 ml. of 1.0 N sodium methoxide in methanol. The reaction mixture was left standing for 45 min. at room temperature, was then neutralized with 0.2 ml. of acetic acid and evaporated to dryness. The residue was crystallized from methanol to yield 9.4 g. of 11β,21-dihydroxy-14α,17α-ethylidene-dioxy-4-pregnene - 3,20 - dione. From the mother liquid, 1.7 g. of this compound was isolated.

Melting point: 251°–253° C.; [α]$_D$=+220° (c.=0.5; in CHCl$_3$)

λ$_{max}$ (in CH$_3$OH) = (percent) 242 mμ; E$^{1\%}_{1cm.}$=404

I.R. (in CHCl$_3$) γ$_{max}$=3616, 3500, 1713, 1665, 1619, 1110 cm.$^{-1}$

N.M.R. (in CDCl$_3$) δ=1.15, 1.31 (doublet), 1.43, ca. 3.1 (disappears after washing with D$_2$O), 4.4 (broad), 5.20 (quadruplet), 5.70 p.p.m.

*Elementary analysis.*—Calculated for C$_{23}$H$_{32}$O$_6$ (percent): C, 68.31; H, 7.92. Found (percent): C, 68.24 and 68.26; H, 7.93 and 7.94.

EXAMPLE 25

In an analogous way to the procedure described in Example 24, 11β,21-dihydroxy-14α,17α - butylidenedioxy-4-pregnene-3,20-dione 21-acetate prepared according to the process of Example 4 was converted to 11β-21-dihydroxy-14α,17α-butylidenedioxy-4-pregnene-3,20-dione.

Melting point: 94.5°–97° C.; [α]$_D$=+190° (c.=0.5; in CHCl$_3$)

λ$_{max}$ (in CH$_3$OH) =242 mμ; E$^{1\%}_{1cm.}$=328

I.R. (in CHCl$_3$) γ$_{max}$=3615, 3500, 1711, 1665, 1615, 1129 cm.$^{-1}$

N.M.R. (in CDCl$_3$) δ=0.93 (triplet), 1.16, 1.49, 4.18, and 4.68 (AB-quartet), 4.48, 5.00 (triplet), 5.72 p.p.m.

*Elementary analysis.*—Calculated for C$_{25}$H$_{36}$O$_6$ (percent): C, 69.44; H, 8.33. Found (percent): C, 69.29 and 69.25; H, 8.33 and 8.35.

EXAMPLE 26

In an analogous way to the procedure described in Example 24, 11β,21-dihydroxy - 14α,17α-ethylidenedioxy-1,4-pregnadiene-3,20-dione 21-acetate, prepared according to the process of Example 19 was converted to 11β,21-dihydroxy-14α,17α-ethylidenedioxy - 1,4 - pregnadiene-3,20-dione.

Melting point: 209°–212° C.; [α]$_D$=+171° (c.=0.5; in CHCl$_3$)

λ$_{max}$ (in CH$_3$OH) =242 mμ; E$^{1\%}_{1cm.}$=356

I.R. (in CHCl$_3$) ν$_{max}$=3613, 3500, 1714, 1663, 1622, 1603, 1089 cm.$^{-1}$ N.M.R. (in CDCl$_3$) δ=1.18, 1.29 (doublet), 1.47, 4.15 and 4.60 (AB-quartet), 4.5, 5.13 (quadruplet), 6.03, 6.28 and 7.37 (AB-quartet) p.p.m.

*Elementary analysis.*—Calculated for C$_{23}$H$_{30}$O$_6$ (percent): C, 68.66; H, 7.46. Found (percent): C, 68.53 and 68.60; H, 7.56 and 7.62.

EXAMPLE 27

In an analogous way to the procedure described in Example 24, 11β,21-dihydroxy-14α,17α-(2-furylmethylenedioxy)-4-pregnene-3,20-dione was obtained from 11β,21-dihydroxy-14α,17α-(2'-furylmethylenedioxy) - 4 - pregnene-3,20-dione 21-acetate prepared according to the process of Example 10.

This compound was isolated as an oil.

[α]$_D$=+181° (c.=0.5; in CHCl$_3$)

λ$_{max}$ (in CH$_3$OH) =217 and 242 mμ; E$^{1\%}_{1cm.}$=330 and 320

I.R. (in CHCl$_3$) ν$_{max}$=3612, 3500, 1712, 1660, 1612, 750 cm.$^{-1}$

N.M.R. (in CDCl$_3$) δ=1.17, 1.45, 4.17 and 4.62 (AB-quartet), 4.52, 5.64, 5.94, 6.40, 7.3–7.5 (multiplet) p.p.m.

*Elementary analysis.*—Calculated for C$_{26}$H$_{37}$O$_7$ (percent): C, 68.42; H, 7.02. Found (percent): C, 68.19 and 68.22; H, 6.85 and 6.91.

EXAMPLE 28

A solution of 5.0 g. of 11β,21 - dihydroxy - 14α,17α-butylidenedioxy-4-pregnene-3,20-dione, prepared according to the process of Example 25 and 3.7 g. of butyric anhydride in 25 ml. of pyridine was kept for 2 hours at room temperature. The reaction mixture was then poured into a solution of 15 g. of ammonium chloride in 300 ml. of water. The precipitate was filtered off and crystallized from methanol, yielding 3.0 g. of 11β,21-dihydroxy-14α,17α - butylidenedioxy - 4 - pregnene-3,20-dione 21-butyrate.

Melting point: 175°–177° C.; [α]_D = +184° (c. = 0.5; in CHCl_3)

$\lambda_{max}$ (in CH_3OH) = 242 mμ; $E^{1\%}_{1\,cm.}$ = 303

I.R. (in CHCl_3) $\nu_{max}$ = 3615, 1740, 1729, 1665, 1618, 1165 cm.$^{-1}$

N.M.R. (in CDCl_3) δ = 0.95 (multiplet), 1.10, 1.43, 2.38 (multiplet), 4.45, 4.85, 4.97 (triplet), 5.68 p.p.m.

*Elementary analysis.*—Calculated for C_29H_42O_7 (percent): C, 69.32; H, 8.37. Found (percent): C, 69.17 and 69.22; H, 8.33 and 8.39.

EXAMPLE 29

In an analogous way to the procedure described in Example 28, 11β,21-dihydroxy-14α,17α - butylidenedioxy-4-pregnene-3,20-dione 21-(1′-adamantyl)carboxylate was prepared from 11β,21-dihydroxy-14α,17α-butylidenedioxy-4-pregnene-3,20-dione prepared according to the process of Example 25 by reaction with 1-adamantylcarbonyl chloride.

Melting point: 276°–277° C.; [α]_D = +177° (c. = 0.5; in CHCl_3)

$\lambda_{max}$ (in CH_3OH) = 242 mμ; $E^{1\%}_{1\,cm.}$ = 289

I.R. (in CHCl_3) $\nu_{max}$ = 3610, 1720, 1662, 1617, 1110 cm.$^{-1}$

N.M.R. (in CDCl_3) δ = 0.92 (triplet), 1.10, 1.42, 1.73, 1.97, 4.48, 4.83, 4.95 (triplet), 5.67 p.p.m.

*Elementary analysis.*—Calculated for C_36H_50O_7 (percent): C, 72.73; H, 8.42. Found (percent): C, 72.65 and 72.69; H, 8.49 and 8.53.

EXAMPLE 30

In an analogous way to the procedure described in Example 28, 11β,21-dihydroxy-14α,17α - butylidenedioxy 4-pregnene-3,20- dione 21-(3′-phenyl)propionate was prepared from 11β,21-dihydroxy-14α,17α-butylidenedioxy-4-pregnane-3,20-dione prepared according to the process of Example 25 by reaction with 3-phenylpropionyl chloride.

Melting point: 163°–166° C.; [α]_D = +167° (c. = 0.5; in CHCl_3)

$\lambda_{max}$ (in CH_3OH) = 242 mμ; $E^{1\%}_{1\,cm.}$ = 266

I.R. (in CHCl_3) $\nu_{max}$ = 3612, 1728, 1664, 1615, 1160, 1153, 1128, 1112 cm.$^{-1}$ N.M.R. (in CDCl_3) δ = 0.93 (triplet), 1.13, 1.44, 4.50, 4.88, 4.98 (triplet) 5.69.

*Elementary analysis.*—Calculated for C_34H_44O_7 (percent): C, 72.34; H, 7.80. Found (percent): C, 72.04 and 72.07; H, 7.89 and 7.90.

EXAMPLE 31

In an analogous way to the procedure described in Example 28, 11β,21-dihydroxy - 14α,17α-butylidenedioxy-4-pregnene-3,20-dione 21-decanoate was prepared from 11β,21-dihydroxy-14α,17α - butylidenedioxy - 4 - pregnene-3,20-dione prepared according to the process of Example 25 by reaction with nonylcarbonyl chloride.

Melting point: 148°–150° C.; [α]_D = +167° (c. = 0.5; in CHCl_3)

$\lambda_{max}$ (in CH_3OH) = 242 mμ; $E^{1\%}_{1\,cm.}$ = 265

I.R. (in CHCl_3) $\nu_{max}$ = 3610, 1740, 1725, 1660, 1614, 1110 cm.$^{-1}$

N.M.R. (in CDCl_3) δ = 0.8–1.0 (multiplet), 1.12, 1.30, 1.43, 4.48, 4.86, 4.98 (triplet), 5.69 p.p.m.

*Elementary analysis.*— Calculated for C_35H_54O_7 (percent): C, 71.67; H, 9.22. Found (percent): C, 71.51 and 71.55; H, 9.21 and 9.29.

EXAMPLE 32

In an analogous way to the procedure described in Example 28, 11β,21-dihydroxy-14α,17α-butylidenedioxy-4-pregnene-3,20-dione 21-pivalate was prepared from 11β, 21-dihydroxy-14α,17α-butylidenedioxy 4-pregnene-3,20-dione prepared according to the process of Example 25 by reaction with pivaloyl chloride.

Melting point: 175–177° C.; [α]_D = +181° (c. = 0.5; in CHCl_3)

$\lambda_{max}$ (in CH_3OH) = 242 mμ; $E^{1\%}_{1\,cm.}$ = 293

I.R. (in CHCl_3) $\nu_{max}$ = 3612, 1735, 1723, 1663, 1615, 1158, 1125, 1110 cm.$^{-1}$ N.M.R. (in CDCl_3) δ = 0.93 (triplet), 1.13, 1.27, 1.45, 4.50, 4.85, 4.98 (triplet), 5.69 p.p.m.

*Elementary analysis.*—Calculated for C_30H_44O_7 (percent): C, 69.77; H, 8.53. Found (percent): C, 69.53 and 69.57; H, 8.50 and 8.51.

EXAMPLE 33

In an analogous way to the procedure described in Example 28, 11β,21-dihydroxy-14α,17α-butylidenedioxy-4-pregnene-3,20-dione 21-isonicotinate was prepared from 11β,21 - dihydroxy - 14α,17α-butylidenedioxy-4-pregnene-3,20-dione prepared according to the process of Example 25 by reaction with isonicotinic acid anhydride.

Melting point: 156°–158° C.; [α]_D = +219° (c. = 0.5; in CHCl_3)

$\lambda_{max}$ (in CH_3OH) = 242 and 285 shoulder) mμ; $E^{1\%}_{1\,cm.}$ = 349 and 50

I.R. (in CHCl_3) $\nu_{max}$ = 3612, 1740, 1726, 1660, 1615, 1599, 1559, 1280, 1125 cm.$^{-1}$ N.M.R. (in CDCl_3) δ = 0.93 (triplet), 1.17, 1.47, 4.51, 5.02 (triplet), 5.15, 5.68, 7.88 and 8.80 (AB-spectrum)

*Elementary analysis.*—Calculated for C_31H_39O_7N (percent): C, 69.27; H, 7.26; N, 2.61. Found (percent): C, 69.39 and 69.23; H, 7.37 and 7.35; N, 2.61 and 2.62.

EXAMPLE 34

(A) According to the process described in Example 1, 14α,17α,21 - trihydroxy-4-pregnene-3,20-dione 21-acetate was converted with paraldehyde to 21-hydroxy-14α,17α-ethylidenedioxy-4-pregnene-3,20-dione 21-acetate.

Melting point: 177–179° C.; [α]_D = +177° (c. = 0.5; in CHCl_3)

I.R. (in CHCl_3) $\nu_{max}$ = 1747, 1730, 1665, 1612, 1112, 1070 cm.$^{-1}$

N.M.R. (in CDCl_3) δ = 0.88, 1.19, 1.37 (doublet), 2.17, 4.90, 5.15 (quadruplet), 5.75 p.p.m.

*Elementary analysis.*—Calculated for C_25H_34O_6 (percent): C, 69.77; H, 7.91. Found (percent): C, 69.49 and 69.53; H, 7.89 and 7.88.

(B) According to the process described in Example 24, the compound thus obtained was converted to 21-hydroxy-14α,17α-ethylidenedioxy-4-pregnene-3,20-dione.

Melting point: 211–215° C.; [α]_D = +158° (c. = 0.5; in CHCl_3)

I.R. (in CHCl_3) $\nu_{max}$ = 3505, 1715, 1668, 1618, 1113, 1092 cm.$^{-1}$

N.M.R. (in CDCl_3) δ = 0.89, 1.17, 1.35 (doublet), 3.13 (triplet), 4.4, 5.17 (quadruplet), 5.75 p.p.m.

*Elementary analysis.*—Calculated for C_23H_32O_5 (percent): C, 71.10; H, 8.30. Found (percent): C, 70.89 and 70.83; H, 8.29 and 8.34.

(C) Ten liters of a nutrient medium consisting of 0.5% of glucose and 0.5% of corn steep liquid were inoculated with 500 ml. of a shake culture of *Curvularia lunata*.

The micro-organism was grown at 26° C. with vigorus shaking and aeration. After 24 h. a solution of 3 g. of 21 - hydroxy-14α,17α-ethylidenedioxy-4-pregnene-3,20-dione prepared according to the above process in 150 ml. of dimethyl formamide was added. Within 48 h. the conversion was complete. The mycelium was filtered off and washed with water. The filtrate and the washing were combined and thrice extracted with 2 l. of methyl isobutyl ketone. The extract was evaporated to dryness under reduced pressure, the residue was crystallized from methanol/water.

1.4 g. of 11β,21-dihydroxy-14α,17α-ethylidenedioxy-4-pregnene-3,20-dione was obtained.

Melting point: 251-253° C.; $[\alpha]_D = +218°$ (c.=0.5; in $CHCl_3$)

$\lambda_{max}$ (in $CH_3OH$) = 242 m$\mu$; $E^{1\%}_{1cm.}$ = 400

I.R. (in $CHCl_3$) $\nu_{max}$ = 3616, 3500, 1713, 1665, 1619, 1110 cm.$^{-1}$

N.M.R. (in $CDCl_3$) $\delta$ = 1.15, 1.31 (doublet), 1.43, 3.1 (disappears after washing with $D_2O$), 4.4, 5.20, 5.70 p.p.m.

*Elementary analysis.*—Calculated for $C_{23}H_{32}O_6$ (percent): C, 68.31; H, 7.92. Found (percent): C, 68.29 and 68.28; H, 7.90 and 7.94.

EXAMPLE 35

(A) In an analogous way to the procedure described in Example 34C, 21-hydroxy-14α,17α-ethylidenedioxy-4-pregnene-3,20-dione prepared according to the processes of Examples 34A and B was converted with *Aspergillus ochraceus* to 11α,21-dihydroxy-14α,17α-ethylidenedioxy-4-pregnene-3,20-dione.

Melting point: 210-214° C.; $[\alpha]_D = +159°$ (c.=0.5; in $CHCl_3$)

$\lambda_{max}$ (in $CH_3OH$) = 242 m$\mu$; $E^{1\%}_{1cm.}$ = 393

I.R. (in $CHCl_3$) $\nu_{max}$ = 3600, 3490, 1712, 1662, 1612, 1402, 1110, 1090 cm.$^{-1}$ N.M.R. (in $CDCl_3$) $\delta$ = 0.91, 1.31, 2.62 (doublet), ca. 4.1, ca. 4.3, and 4.5 (AB-quartet), 5.18 (quadruplet), 5.74 p.p.m.

*Elementary analysis.*—Calculated for $C_{23}H_{32}O_6$ (percent): C, 68.13; H, 7.92. Found (percent): C, 68.20 and 68.18; H, 7.92 and 7.94.

According to the process described in Example 28 the compound thus obtained was converted with acetic anhydride to 11α,21-dihydroxy-14α,17α-ethylidenedioxy-4-pregnene-3,20-dione 21-acetate.

(B) 12 g. of 11α,21-dihydroxy-14α,17α-ethylidenedioxy-4-pregnene-3,20-dione 21-acetae prepared according to the above process were stirred in a solution of 4 g. of $CrO_3$ in 140 ml. of acetic acid and 40 ml. of water. The conversion was complete within 10 minutes (thin layer chromatography)

After 15 minutes a solution of 12 g. of sodium hydrogen sulphite in 120 ml. of water was added to decompose the excess of reagent. The reaction mixture was diluted with water and extracted with methyl isobutylketone. The extract was washed with an aqueous hydrogen carbonate solution and water and evaporated to dryness in vacuo. The residue was taken up in a little benzene and separated on a silica gel column (700 g. of silica gel; eluent:benzene/acetone 11:1). The fractions containing the product were combined and evaporated to dryness in vacuo. The residue was crystallized from methyl isobutylketone; yield: 5.2 g. of 21-hydroxy-14α,17α-ethylidenedioxy-4-pregnene-3,11,20-trione 21-acetate.

Melting point: 243-245° C.; $[\alpha]_D = +252°$ (c.=0.5; in $CHCl_3$)

$\lambda_{max}$ (in $CH_3OH$) = 237 m$\mu$; $E^{1\%}_{1cm.}$ = 357

I.R. (in $CHCl_3$) $\nu_{max}$ = 1745, 1730, 1705, 1664, 1615, 1406, 1372, 1109 cm.$^{-1}$ N.M.R. (in $CDCl_3$) $\delta$ = 0.84, 1.40, 1.45 (doublet), 3.29-3.51 (AB-spectrum), 4.81-4.83 (AB-spectrum), 5.31 (multiplet), 5.73 p.p.m.

*Elementary analysis.*—Calculated for $C_{25}H_{32}O_7$ (percent): C, 67.57; H, 7.21. Found (percent): C, 67.34 and 67.29; H, 7.35 and 7.33.

EXAMPLE 36

A solution of 4 g. of 21-hydroxy 14α,17α-ethylidenedioxy-4-pregnene-3,11,20-trione 21-acetate prepared according to the processes of Example 35 in 40 ml. of methylene chloride was saturated with nitrogen for 30 minutes. 1 ml. of 1 N solution of sodium methoxide in methanol was added and the mixture was stirred at room temperature in a nitrogen atmosphere. The conversion was complete within 20 minutes (thin layer chromatography). The mixture was neutralized and evaporated to dryness. After crystallization from methyl isobutyl ketone/diethyl ether the residue yielded 2.2 g. of 21-hydroxy-14α,17α-ethylidenedioxy-4-pregnene-3,11,20-trione. Repeated crystallization from methanol and from diethyl ether afforded a product melting at 205-208° C.; $[\alpha]_D + 345°$ (c.=0.5; in $CHCl_3$)

$\lambda_{max}$ (in $CH_3OH$) = 238 m$\mu$; $E^{1\%}_{1cm.}$ = 397

I.R. (in $CHCl_3$) $\nu_{max}$ = 3480, 1708, 1665, 1616, 1405, 1111 cm.$^{-1}$

N.M.R. (in $CDCl_3$) $\delta$ = 0.94, 1.39, 1.44 (doublet), 3.28-3.48 (AB-spectrum), 4.31-4.45 (AB-spectrum, 5.32 (multiplet), 5.73 p.p.m.

*Elementary analysis.*—Calculated for $C_{23}H_{30}O_6$ (percent): C, 68.66; H, 7.46. Found (percent): C, 68.55 and 68.50; H, 7.47 and 7.44.

The invention includes within its scope pharmaceutical preparations containing, as the active ingredient, at least one of the therapeutically active compounds of the general formula according to fig. 1 in association with a pharmaceutically acceptable carrier. The preparations may take any of the forms customarily employed for administration of therapeutically active substances, but the preferred types are those suitable for oral administartion, especially tablets, including sustained release tablets, pills and capsules including the substance, those suitable for parenteral administration and those for local application.

The tablets and pills may be formulated in the usual manner with one or more pharmaceutically acceptable diluents or excipients, and include materials of lubricating nature. Capsules made of absorbable material, such as gelatin, may contain the active substance alone or in admixture, with a solid or liquid diluent. Liquid preparations may be in the form of suspensions, emulsions, syrups, or elixirs of the active substance in water or other liquid medium commonly used for making orally acceptable pharmaceutical formulations. The active substance may also be made up in a form suitable for parenteral administration, i.e. as a suspension or emulsion in sterile water or an organic liquid usually employed for injectable preparations, for example a vegetable oil such as corn or olive oil, or a sterile solution in water or an organic solvent.

The active substance may also be made up in creams, ointments and lotions suitable for local application. These preparations may be formulated in the usual manner with one or more pharmaceutically acceptable diluents or excipients. The preparation of a suitable cream for local application is described in the following example.

EXAMPLE 37

Ingredients:
11β,21 - dihydroxy - 14α,17α-butylidenedioxy-4-pregnene-3,20-dione 21-isonicotinate—25 mg.
Lanette 0—7.2 g.
Cetomacrogol 100—1.8 g.
Paraffin liq.—6.0 g.
Vaseline—15.0 g.
p-Chloro-m-cresol—0.1 g.
Sodium benzoate—0.1 g.
Citric acid (anhydrous)—0.25 g.
Sodium citrate—0.4 g.
Water, ad 100.0 g.

PREPARATION

A mixture of lanette 0, cetomacrogol 1000 (=polyethylene glycol 1000 monocetyl ether), paraffin liq. and vaseline was stirred at 80° C. until homogeneous. Then the citric acid the sodium citrate and the sodium benzoate were dissolved in 68 ml. of water. Of 1 ml. of this solution the pH was established (should be about 5) and this ml. solution was set apart. The p-chloro-m-cresol was added to the aqueous solution and the mixture was heated to about 70° C. Then while stirring was continued vigorously the first mixture was added (if desired through a filter cloth). The cream thus obtained was cooled while stirring was continued to room temperature.

The steroid (particle size below 10μ) was brought in suspension in the 1 ml. aqueous solution that was set apart and this mixture was added to the cream obtained. The mixture was homogenized during 30 minutes in a homogenizor.

When used for local application the concentration of the active compound of Formula 1 in the creams, ointments and lotions may vary between 0.01% and 1%. For oral use, in the form of tablets for example, each tablet may contain from 0.25 mg. to 25 mg. of the active substance. Suitable daily dosages to humans consist of 1 to 4 tablets. When used for parenteral administration, for example suspensions for intramuscular administration or solutions for intravenous administration concentrations may vary from 5 to 25 mg./ml., while the daily dosage in human application will vary from 1 to 2 ml.

For use in the veterinary field the concentration of the active substance in injectable preparations (suspensions as well as solutions) may vary from 0.1 to 10 mg./ml. Daily dosages
1 to 2 ml. for dogs and cats
1 to 3 ml. for pigs
10 to 15 ml. for cows and horses.

What we claim and desire to secure by Letters Patent is:

1. 14α,17α-methylenedioxypregnane derivative of the formula

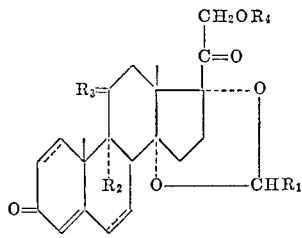

in which the dotted lines in positions 1–2 and 6–7 indicate the optional presence of another bond, and wherein
$R_1$ represents
  (a) a straight or branched chain aliphatic hydrocarbon group, which group has less than 9 carbon atoms and may be substituted by a lower-alkoxycarbonyl group,
  (b) a phenyl group which phenyl group has less than 11 carbon atoms and may be substituted in the para position by a halogen atom, a lower-alkyl, and a lower-alkoxy group or the naphthyl group,
  (c) an aryl-lower-alkyl group,
  (d) a cycloalkyl group having 3 to 6 carbon atoms,
  (e) the furyl group, or
  (f) the thienyl group;
$R_2$ represents an α-hydrogen atom or an α-halogen atom;
$R_3$ represents
  (a) an α-hydrogen atom together with a β-hydroxyl group or a β-halogen atom or
  (b) an oxo group, and
$R_4$ represents a hydrogen atom or an acyl group of an organic carboxylic acid.

2. 14α,17α-methylenedioxypregnane derivative according to claim 1, wherein $R_1$ represents a straight or branched chain alkyl group of less than 5 carbon atoms.

3. 14α,17α-methylenedioxypregnane derivative according to claim 1 wherein $R_1$ represents a methyl, ethyl, propyl, butyl, 2-methylpropyl or propenyl group.

4. 14α,17α-methylenedioxypregnane derivative according to claim 1, wherein $R_3$ represents an α-hydrogen atom and a β-hydroxyl group.

5. 14α,17α-methylenedioxypregnane derivative according to claim 1, wherein $R_4$ represents a hydrogen atom.

6. 14α,17α-methylenedioxypregnane derivative according to claim 1 in which the derivative is 11β,21-dihydroxy-14α,17α-ethylidenedioxy-4-pregnene-3,20-dione.

7. 14α,17α-methylenedioxypregnane derivative according to claim 1 in which the derivative is 11β,21-dihydroxy-14α,17α-ethylidenedioxy-4-pregnene-3,20-dione - 21 - acetate.

8. 14α,17α-methylenedioxypregnane derivative according to claim 1 in which the derivative is 11β,21-dihydroxy-14α,17α-ethylidenedioxy-1,4-pregnadiene-3,20-dione.

9. 14α,17α-methylenedioxypregnane derivative according to claim 1 in which the derivative is 11β,21-dihydroxy-14α,17α-ethylidenedioxy-1,4-pregnadiene-3,20 - dione-21-acetate.

10. 14α,17α-methylenedioxypregnane derivative according to claim 1 in which the derivative is 11β,21-dihydroxy-14α,17α-ethylidenedioxy-4,6 - pregnadiene - 3,20 - dione 21-acetate.

11. 14α,17α-methylenedioxypregnane derivative according to claim 1 in which the derivative is 11β,21-dihydroxy-14α,17α-ethylidenedioxy-1,4,6-pregnatriene - 3,20 - dione 21-acetate.

12. 14α,17α-methylenedioxypregnane derivative according to claim 1 in which the derivative is 11β,21-dihydroxy 9α-bromo - 14α,17α - ethylidenedioxy - 1,4 - pregnadiene-3,20-dione 21-acetate.

13. 14α,17α-methylenedioxypregnane derivative according to claim 1 in which the derivative is 11β,21-dihydroxy-14α,17α-propylidenedioxy-4-pregnene-3,20 - dione 21-acetate.

14. 14α,17α-methylenedioxypregnane derivative according to claim 1 in which the derivative is 11β,21-dihydroxy-14α,17α-butylidenedioxy-4-pregnene-3,20-dione.

15. 14α,17α-methylenedioxypregnane derivative according to claim 1 in which the derivative is 11β,21-dihydroxy-14α,17α-butylidenedioxy-4-pregnene - 3,20 - dione 21-acetate.

16. 14α,17α-methylenedioxypregnane derivative according to claim 1 in which the derivative is 11β,21-dihydroxy-14α,17α-butylidenedioxy - 4 - pregnene - 3,20 - dione 21-butyrate.

17. 14α,17α-methylenedioxypregnane derivative according to claim 1 in which the derivative is 11β,21-dihydroxy-14α,17α-butylidenedioxy-4-pregnene-3,20 - dione - 21 - (1' adamantyl)carboxylate.

18. 14α,17α-methylenedioxypregnane derivative according to claim 1 in which the derivative is 11β,21-dihydroxy-14α,17α-butylidenedioxy-4-pregnene-3,20 - dione 21 - (3'-phenyl)propionate.

19. 14α,17α-methylenedioxypregnane derivative according to claim 1 in which the derivative is 11β,21-dihydroxy-14α,17α-butylidenedioxy-4-pregnene - 3,20 - dione - 21-decanoate.

20. 14α,17α-methylenedioxypregnane derivative according to claim 1 in which the derivative is 11β,21-dihydroxy-14α,17α-butylidenedioxy - 4 - pregnene - 3,20 - dione 21-pivalate.

21. 14α,17α-methylenedioxypregnane derivative according to claim 1 in which the derivative is 11β,21-dihydroxy-14α,17α-butylidenedioxy - 4 - pregnene - 3,20 - dione 21-isonicotinate.

22. 14α17α-methylenedioxypregnane derivative according to claim 1 in which the derivative is 11β,21-dihydroxy-14α,17α-pentylidenedioxy - 4 - pregnene - 3,20 - dione 21-acetate.

23. 14α,17α-methylenedioxypregnane derivative according to claim 1 in which the derivative is 11β,21-dihydroxy-14α,17α-(2'butenylidenedioxy)-4-pregnene-3,20-dione 21-acetate.

24. 14α,17α-methylenedioxypregnane derivative according to claim 1 in which the derivative is 11β,21-dihydroxy-14α,17α-(3′-methylbutylidenedioxy) 4 - pregnene - 3,20-dione 21-acetate.

25. 14α,17α-methylenedioxypregnane derivative according to claim 1 in which the derivative is 11β,21-dihydroxy-14α,17α-benzylidenedioxy-4-pregnene - 3,20 - dione 21-acetate.

26. 14α,17α-methylenedioxypregnane derivative according to claim 1 in which the derivative is 11β,21-dihydroxy-14α,17α-(p-chlorobenzylidenedioxy) - 4 - pregnene-3,20-dione 21-acetate.

27. 14α,17α-methylenedioxypregnane derivative according to claim 1 in which the derivative is 11β,21-dihydroxy-14α,17α-(p-isopropylbenzylidenedioxy) - 4 - pregnene-3,20-dione 21-acetate.

28. 14α,17α - methylenedioxypregnane derivative according to claim 1 in which the derivative is 11β, 21-dihydroxy - 14α,17α - (p-methoxybenzylidenedioxy)-4-pregnene-3,20-dione 21-acetate.

29. 14α,17α - methylenedioxypregnane derivative according to claim 1 wherein $R_1$ represents a phenyl-loweralkyl group, a cyclopropyl, furyl or thienyl group.

30. 11α,17α - methylenedioxypregnane derivative according to claim 11 in which the derivative is 11β,21-dihydroxy-14α,17α-((3′-phenylpropylidenedioxy - 4 - pregnene-3,20-dione 21-acetate.

31. 14α,17α - methylenedioxypregnane derivative according to claim 1 in which the derivative is 11β,21-dihydroxy-14α,17α - cyclopropylmethylenedioxy - 4 - pregnene-3,20-dione 21-acetate.

32. 14α,17α - methylenedioxypregnane derivative according to claim 1 in which the derivative is 11β,21-dihydroxy-14α,17α-(2′-furylmethylenedioxy) - 4 - pregnene-3,20-dione.

33. 14α,17α - methylenedioxypregnane derivative according to claim 1 in which the derivative is 11β,21-dihydroxy-14α,17α-(2′-furylmethylenedioxy) - 4 - pregnene-3,20-dione 21-acetate.

34. 14α,17α - methylenedioxypregnane derivative according to claim 1 in which the derivative is 11β,21-dihydroxy-14α,17α-(2′-thienylmethylenedioxy) - 4 - pregnene-3,20-dione 21-acetate.

35. 14α,17α - methylenedioxypregnane derivative according to claim 1 in which the derivative is 11β,21-dihydroxy-14α,17α-nonylidenedioxy 4-pregnene - 3,20 - dione 21-acetate.

36. 14α,17α - methylenedioxypregnane derivative according to claim 1 in which the derivative is 11β,21-dihydroxy-14α,17α-(3′ - methoxycarbonylpropylidenedioxy)-4-pregnene-3,20-dione 21-acetate.

37. 14α,17α - methylenedioxypregnane derivative according to claim 1 in which the derivative is 11β,21-dihydroxy - 14α,17α - (1′-naphthylmethylenedioxy) - 4 - pregnene-3,20-dione 21-acetate.

38. 14α,17α - methylenedioxypregnane derivative according to claim 1 in which the derivative is 11β,21-dihydroxy-14α,17α - cyclohexylmethylenedioxy-4-pregnene-3, 20-dione 21-acetate.

39. 14α,17α - methylenedioxypregnane derivative according to claim 1 in which the derivative is 21-hydroxy-14α,17α-ethylidenedioxy - 9α,11β - dichloro-1,4-pregnadiene-3,20-dione 21-acetate.

40. 14α,17α - methylenedioxypregnane derivative according to claim 1 in which the derivative is 21-hydroxy-14α,17α-ethylidenedioxy - 4 - pregnene-3,11,20-trione.

41. 14α,17α - methylenedioxypregnane derivative according to claim 1 in which the derivative is 21-hydroxy-14α,17α-ethylidenedioxy - 4 - pregnene-3,11,20-trione 21-acetate.

References Cited

Djerassi: Steroid Reactions, p. 70–71 (1963).

HENRY A. FRENCH, Primary Examiner

U.S. Cl. X.R.

195—51 A, 51 R; 424—241